(12) United States Patent
Li

(10) Patent No.: US 11,038,884 B2
(45) Date of Patent: *Jun. 15, 2021

(54) BLOCKCHAIN-BASED COPYRIGHT PROTECTION METHOD AND APPARATUS, AND ELECTRONIC DEVICE

(71) Applicant: ADVANCED NEW TECHNOLOGIES CO., LTD., Grand Cayman (KY)

(72) Inventor: Zhiguo Li, Hangzhou (CN)

(73) Assignee: ADVANCED NEW TECHNOLOGIES CO., LTD., George Town (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/125,240

(22) Filed: Dec. 17, 2020

(65) Prior Publication Data

US 2021/0112058 A1 Apr. 15, 2021

Related U.S. Application Data

(63) Continuation of application No. 16/870,507, filed on May 8, 2020, now Pat. No. 10,904,251, which is a (Continued)

(30) Foreign Application Priority Data

May 17, 2019 (CN) .......................... 201910414131.7

(51) Int. Cl.
*H04L 29/06* (2006.01)
*G06F 21/10* (2013.01)
(Continued)

(52) U.S. Cl.
CPC .......... *H04L 63/0876* (2013.01); *G06F 21/10* (2013.01); *H04L 9/0637* (2013.01);
(Continued)

(58) Field of Classification Search
CPC ............... H04L 63/0876; H04L 9/0637; H04L 2209/603; H04L 2209/38; H04N 21/8352;
(Continued)

(56) References Cited

U.S. PATENT DOCUMENTS

| 4,979,210 A | 12/1990 | Nagata et al. |
| 5,613,004 A | 3/1997 | Cooperman et al. |

(Continued)

FOREIGN PATENT DOCUMENTS

| CN | 102238388 A | 11/2011 |
| CN | 102254565 A | 11/2011 |

(Continued)

OTHER PUBLICATIONS

Zhao et al., "Robust Blockchain-Based Cross-Platform Audio Copyright Protection System Using Content-Based Fingerprint", 2020, Web Information Systems Engineering (WISE) 2020, pp. 201-212 (Year: 2020).*

(Continued)

*Primary Examiner* — John B King

(57) ABSTRACT

Methods, systems, and apparatus, including computer programs encoded on computer storage media, for a blockchain-based right protection. One of the methods includes: sending, to a blockchain network, a request for verifying a right to access a digital product, the request comprising identity information associated with a target user; receiving, from the blockchain network, a response comprising a result of verifying the right to access the digital product based on the identity information associated with the target user; in response to the result being that the verifying the right to access the digital product is successful, determining identification information for tracing the target user; and embedding the identification information for tracing the target user in content associated with the digital product.

15 Claims, 2 Drawing Sheets

---

Based on a blockchain, eligibility verification for a digital product is performed on a target user — S102

After the target user passes the eligibility verification for the digital product, identification information for tracing the target user is determined — S104

When the target user presents the digital product using a terminal device, the identification information is embedded in content corresponding to the digital product presented by the terminal device — S106

Related U.S. Application Data continuation of application No. PCT/CN2020/071143, filed on Jan. 9, 2020.

(51) Int. Cl.
*H04N 19/625* (2014.01)
*H04N 21/8352* (2011.01)
*H04L 9/06* (2006.01)

(52) U.S. Cl.
CPC ....... *H04N 19/625* (2014.11); *H04N 21/8352* (2013.01); *G06F 2221/0713* (2013.01); *H04L 2209/38* (2013.01); *H04L 2209/603* (2013.01)

(58) Field of Classification Search
CPC .................. H04N 19/625; G06F 21/10; G06F 2221/0713
See application file for complete search history.

(56) References Cited

U.S. PATENT DOCUMENTS

| | | | |
|---|---|---|---|
| 5,621,793 | A | 4/1997 | Bednarek et al. |
| 5,721,788 | A | 2/1998 | Powell et al. |
| 6,430,301 | B1 | 8/2002 | Petrovic |
| 6,611,599 | B2 | 8/2003 | Natarajan |
| 8,571,993 | B2 | 10/2013 | Kocher et al. |
| 8,776,216 | B2 | 7/2014 | Boccon-Gibod et al. |
| 9,177,116 | B2 | 11/2015 | Elazar et al. |
| 9,252,957 | B2 | 2/2016 | Durand et al. |
| 9,595,034 | B2 | 3/2017 | Van Rooyen et al. |
| 10,594,689 | B1 * | 3/2020 | Weaver ................. H04L 9/3247 |
| 10,645,180 | B1 | 5/2020 | Batey et al. |
| 2001/0031066 | A1 | 10/2001 | Meyer et al. |
| 2006/0140403 | A1 | 6/2006 | Moskowitz |
| 2007/0291978 | A1 | 12/2007 | Kim et al. |
| 2009/0228709 | A1 | 9/2009 | Kellerman |
| 2010/0220861 | A1 | 9/2010 | Moskowitz |
| 2013/0294641 | A1 | 11/2013 | Moskowitz |
| 2014/0143153 | A1 | 5/2014 | Suzuki et al. |
| 2017/0116693 | A1 | 4/2017 | Rae et al. |
| 2018/0018655 | A1 | 1/2018 | Phillips et al. |
| 2018/0198617 | A1 | 7/2018 | Drouin et al. |
| 2018/0343110 | A1 | 11/2018 | Funk |
| 2019/0057115 | A1 | 2/2019 | Liu et al. |
| 2019/0294761 | A1 | 9/2019 | Kim et al. |
| 2019/0318067 | A1 | 10/2019 | Chappelier et al. |
| 2019/0361867 | A1 | 11/2019 | Nilsson et al. |
| 2020/0019677 | A1 | 1/2020 | Pangaev |
| 2020/0034792 | A1 | 1/2020 | Rogers et al. |

FOREIGN PATENT DOCUMENTS

| | | |
|---|---|---|
| CN | 102073819 B | 5/2013 |
| CN | 103678960 A | 3/2014 |
| CN | 105303069 A | 2/2016 |
| CN | 107659610 A | 2/2018 |
| CN | 107798650 A | 3/2018 |
| CN | 108389059 A | 8/2018 |
| CN | 108932410 A | 12/2018 |
| CN | 109492351 A | 3/2019 |
| CN | 109635521 A | 4/2019 |
| CN | 109711120 A | 5/2019 |
| CN | 109792553 A | 5/2019 |
| CN | 110263503 A | 9/2019 |
| EP | 3552129 A1 | 10/2019 |
| EP | 3605370 A2 | 2/2020 |
| KR | 20160002778 A | 1/2016 |
| WO | 2018032890 A1 | 2/2018 |
| WO | 2019141293 A2 | 7/2019 |

OTHER PUBLICATIONS

Search Report for Chinese Application No. 201910414131.7, dated May 21, 2020, 1 page.
First Office Action for Chinese Application No. 201910414131.7, dated May 29, 2020, 15 pages.
International Search Report for PCT Application No. PCT/CN2020/071143, dated Nov. 26, 2020.

* cited by examiner

BLOCKCHAIN-BASED COPYRIGHT PROTECTION METHOD AND APPARATUS, AND ELECTRONIC DEVICE

CROSS REFERENCE TO RELATED APPLICATIONS

This application is a continuation application of U.S. patent application Ser. No. 16/870,507, filed May 8, 2020, which is a continuation application of International Patent Application No. PCT/CN2020/071143, filed with the China National Intellectual Property Administration (CNIPA) of People's Republic of China on Jan. 9, 2020. International Patent Application No. PCT/CN2020/071143 is based on and claims priority to and benefit of Chinese Patent Application No. 201910414131.7, filed with the CNIPA on May 17, 2019. The entire contents of all of the above-identified applications are incorporated herein by reference.

TECHNICAL FIELD

Embodiments of the specification relate to the field of blockchain technologies, and in particular, to a method, an apparatus, a system, a computer readable storage medium, and an electronic device for blockchain-based copyright protection.

BACKGROUND

Digital products (e.g., text, images, audios and videos, applications, and the like) can be replicated with no loss and can be easily distributed. Therefore, unauthorized dissemination is common. Recapture (e.g., screen camcording) is one of the most commonly used methods of the unauthorized dissemination. At present, it is difficult to trace a recapturer after the recaptured resources appear on the Internet, making it impossible to contain the phenomenon of recapture as of today.

In view of the above, there is an urgent need for a technical solution capable of effectively restricting the recapture behaviors of digital products.

SUMMARY

The embodiments of the specification provide a method, an apparatus, a system, a computer readable storage medium, and an electronic device for blockchain-based copyright protection, which can effectively restrict recapture behaviors of digital products.

To achieve the above objective, the embodiments of the specification are implemented as follows.

According to a first aspect, a blockchain-based copyright protection method is provided, comprising: performing, based on a blockchain, eligibility verification for a digital product on a target user; determining, after the target user passes the eligibility verification for the digital product, identification information for tracing the target user; and embedding, when the target user presents the digital product using a terminal device, the identification information in content corresponding to the digital product presented by the terminal device.

According to another aspect, a blockchain-based copyright protection method is provided. The method may include: sending, to a blockchain network, a request for verifying a right to access a digital product, the request comprising identity information associated with a target user; receiving, from the blockchain network, a response comprising a result of verifying the right to access the digital product based on the identity information associated with the target user; in response to the result being that the verifying the right to access the digital product is successful, determining identification information for tracing the target user; and embedding the identification information for tracing the target user in content associated with the digital product.

According to a second aspect, a blockchain-based copyright protection apparatus is provided, comprising: an eligibility verification module configured to perform, based on a blockchain, eligibility verification for a digital product on a target user; an identification information generating module configured to determine, after the target user passes the eligibility verification for the digital product, identification information for tracing the target user; and an identification information embedding module configured to embed, when the target user presents the digital product using a terminal device, the identification information in content corresponding to the digital product presented by the terminal device.

According to a third aspect, an electronic device is provided, comprising: a memory, a processor, and a computer program stored in the memory and configured to run on the processor, wherein the computer program is executed by the processor to: perform, based on a blockchain, eligibility verification for a digital product on a target user; determine, after the target user passes the eligibility verification for the digital product, identification information for tracing the target user; and embed, when the target user presents the digital product using a terminal device, the identification information in content corresponding to the digital product presented by the terminal device.

According to a fourth aspect, a computer readable storage medium is provided, wherein a computer program is stored in the computer readable storage medium, and the computer program, when being executed by a processor, implements the following steps: performing, based on a blockchain, eligibility verification for a digital product on a target user; determining, after the target user passes the eligibility verification for the digital product, identification information for tracing the target user; and embedding, when the target user presents the digital product using a terminal device, the identification information in content corresponding to the digital product presented by the terminal device.

According to another aspect, a non-transitory computer-readable storage medium for blockchain-based right protection is provided. The storage medium may be configured with instructions executable by one or more processors to cause the one or more processors to perform operations include: sending, to a blockchain network, a request for verifying a right to access a digital product, the request comprising identity information associated with a target user; receiving, from the blockchain network, a response comprising a result of verifying the right to access the digital product based on the identity information associated with the target user; in response to the result being that the verifying the right to access the digital product is successful, determining identification information for tracing the target user; and embedding the identification information for tracing the target user in content associated with the digital product.

In an embodiment, the identity information comprises an ID number associated with the target user, an account number associated with the target user, and an identification number associated with a terminal device associated with the user.

In an embodiment, the identification information for tracing the target user is determined further based on time information or location information associated with access to the digital product by the target user.

In an embodiment, the determining identification information for tracing the target user comprises determining the information for tracing the target user based on the received response.

In an embodiment, the content associated with the digital product comprises video data and the identification information comprises a graphic identifier.

In an embodiment, the embedding the identification information for tracing the target user in content associated with the digital product comprises: obtaining a plurality of content blocks from the video data by performing blockchain processing on the video data based on play specifications of a terminal device associated with the target user for the video data; performing Discrete Cosine Transform on the obtained content blocks to obtain a frequency coefficient corresponding to each of the obtained content blocks; and splitting and embedding the graphic identifier into one or more of the obtained content blocks that each has a frequency coefficient greater than a present threshold.

In an embodiment, the content associated with the digital product comprises video data and the identification information comprises a graphic identifier, and the embedding the identification information for tracing the target user in content associated with the digital product comprises displaying the graphic identifier above a display layer of a terminal device associated with the target user for the video data.

In an embodiment, the content associated with the digital product comprises audio data and the identification information comprises an audio identifier, and the embedding the identification information for tracing the target user in content associated with the digital product comprises playing the audio identifier at a play progress location designated by a terminal device associated with the target user for the audio data.

According to another aspect, a system for blockchain-based right protection is provided. The system may comprise a processor and a non-transitory computer-readable storage medium storing instructions executable by the processor to cause the system to perform operations include: sending, to a blockchain network, a request for verifying a right to access a digital product, the request comprising identity information associated with a target user; receiving, from the blockchain network, a response comprising a result of verifying the right to access the digital product based on the identity information associated with the target user; in response to the result being that the verifying the right to access the digital product is successful, determining identification information for tracing the target user; and embedding the identification information for tracing the target user in content associated with the digital product.

Based on the solutions of the embodiments of the specification, before using a digital product with a terminal device, a user needs to complete eligibility verification based on a blockchain for the digital product. After the user passes the eligibility verification, the terminal device needs to embed identification information for tracing the user in a presented content of the digital product, so that, if the digital product is recaptured, a user who provides recaptured resources can be located according to the identification information in the recaptured content, thereby containing unauthorized recapture behaviors to a certain degree and effectively safeguarding interests of owners of digital products.

BRIEF DESCRIPTION OF THE DRAWINGS

To more clearly describe the technical solutions of embodiments of the specification or of the current technologies, the accompanying drawings to be used in the description of the embodiments or the current technologies will be briefly described. The accompanying drawings in the description below are merely some of the embodiments of the specification. Other drawings may be obtainable to one of ordinary skill in the art without creative effort according to these accompanying drawings.

DETAILED DESCRIPTION

To enable one of ordinary skill in the art to better understand the technical solutions of the specification, the technical solutions of the embodiments of the specification will be clearly and completely described below with reference to the accompanying drawings in the embodiments of the specification. The described embodiments are merely some, but not all, embodiments of the specification. All other embodiments obtained, based on some embodiments of the specification, by one of ordinary skill in the art without creative effort shall fall within the protection scope of the specification.

As described above, currently there is no effective restriction on recapture behaviors of digital products. As a result, unauthorized recapture of digital products is rampant, which severely infringes the interests of owners. In view of this, the specification aims to provide a copyright protection solution that can trace a user who provides the recaptured resources, which can effectively solve the above-described problem.

Figure 1:
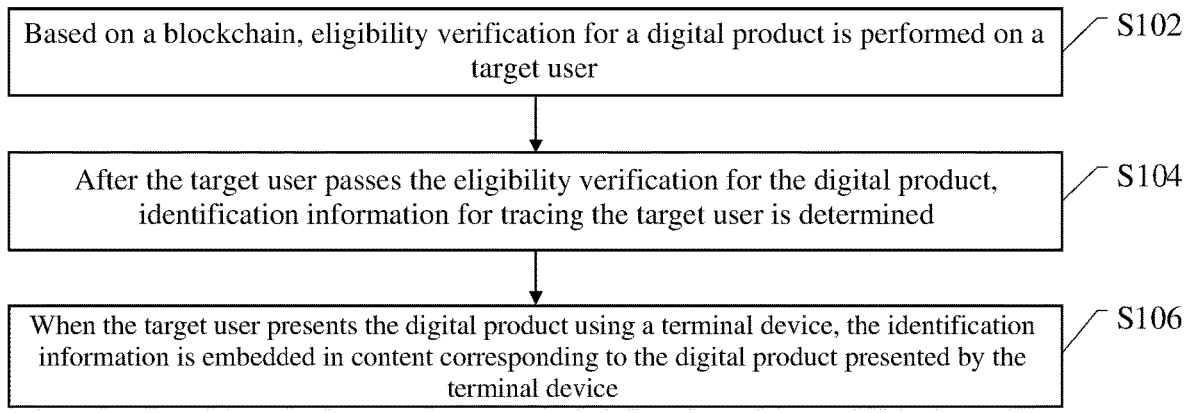
FIG. 1 is a flow chart of a blockchain-based copyright protection method according to some embodiments of the specification.

FIG. 1 is a flow chart of a blockchain-based copyright protection method according to some embodiments of the specification. The method shown in FIG. 1 may be implemented by a corresponding apparatus in the description below. The method may comprise the following steps.

In Step S102, based on a blockchain, eligibility verification for a digital product is performed on a target user.

The digital product may be, but not limited to, a video product including a movie, a TV show, and the like, an audio product including a song, Chinese storytelling, and the like, a text product including a novel, an academic paper, and the like, and an image product including a photo, an illustration, and the like.

In this step, a request for verifying a right to access a digital product, such as a message of an eligibility verification request for the digital product, may be sent to a blockchain network, such as the blockchain. The eligibility verification request carries eligibility information of the target user, such as an identity information associated with the target user. Then, a response comprising a result of verifying the right to access the digital product based on the identity information associated with the target user, such as a message of an eligibility verification response, returned from the blockchain is received, and the message of the eligibility verification response carries an eligibility verification result from the eligibility verification performed by the blockchain based on the eligibility information for the digital product.

The solution of performing the eligibility verification for the digital product based on the blockchain technology in the specification may include other techniques. However, the information regarding the right to use and the right of ownership of the digital product may be based on the blockchain for achieving the eligibility verification for the digital product. In addition, the traceability of the blockchain enable every step of operations, such as use and circulation, on the digital product to be recorded in the blockchain, so that the information is endorsed with unprecedented strong trust, which provides effective data support for verifying the right of ownership and the right to use of the digital product.

In Step S104, after the target user passes the eligibility verification for the digital product, such as in response to the result being that the verifying the right to access the digital product is successful, identification information for tracing the target user is determined. In other words, the identification information for tracing the target user is determined based on the received response, such as the message of an eligibility verification response.

For example, in this step, the digital product may be first classified to determine the type of data contained in the digital product. Then, relevant information of the target user is encoded into the identification information corresponding to the digital product in an identification information encoding manner matching the data type.

For example, if the digital product comprises data of an audio type, the corresponding identification information encoding manner may encode relevant information of the target user into an audio identifier that can be embedded into the audio data. For another example, if the digital product comprises data of a video type, the corresponding identification information encoding manner may encode relevant information of the target user into a graphic identifier that can be embedded into the video data.

Herein, the relevant information of the target user may be determined and obtained from user identity information of the target user (e.g., International Mobile Subscriber Identity, ID number of the target user, etc.) and/or identity information of the terminal device of the target user (e.g., International Mobile Equipment Identity, product serial number of the terminal device, etc.)

In Step S106, when the target user presents the digital product using a terminal device, the identification information for tracing the target user is embedded in the content corresponding to the digital product presented by the terminal device.

For example, in this step, the identification information for tracing the target user may be embedded, as plaintext information or ciphertext information, into the presented content of the digital product. The plaintext information refers to information that can be obtained through observation with a naked eye of the presented content, and can play a role of announcing the ownership of the copyright of the digital product and warning the target user not to recapture the digital product. The ciphertext information refers to information that cannot be obtained through observation with a naked eye of the presented content, and can prevent the target user from purposely covering the identification information during a recapturing process to escape from liabilities.

Based on the copyright protection method shown in FIG. 1, before using a digital product with a terminal device, a user needs to complete eligibility verification based on a blockchain for the digital product. After the user passes the eligibility verification, the terminal device needs to embed identification information for tracing the user in a presented content of the digital product, so that, if the digital product is recaptured, a user who provides recaptured resources can be located according to the identification information in the recaptured content, thereby containing unauthorized recapture behaviors to a certain degree and effectively safeguarding interests of owners of digital products.

The method according to some embodiments of the specification will be described in detail below.

For example, the copyright protection method according to some embodiments of the specification mainly comprises the following phases.

Phase I, right of a digital product is determined.

When a target user is to use a digital product through a terminal device, the target user may send an eligibility verification request message for the digital product to a blockchain.

Here, the eligibility verification request message carries eligibility information of the target user. The eligibility information may comprise identity information of the target user (e.g., the ID number associated with the target user) or information that has passed real-name verification (e.g., a cell phone number, an Alipay account number, etc.)

The action that the terminal device sends the eligibility verification request message may be deemed as a use request for using the digital product initiated by the target user to a server. Based on the blockchain technology, the server confirms the right to use for the target user, i.e., the above-described determining verification operation.

After receiving the eligibility verification request message sent from the terminal device, the blockchain performs eligibility verification for the digital product on the target user based on the eligibility information carried in the eligibility verification request message. At the same time, the blockchain may also record the operation that the target user initiates the eligibility verification request message, so as to prove that the target user attempts to use the digital product in the current time node.

After the blockchain completes the eligibility verification, an eligibility verification result can be returned to the terminal device associated with the target user.

In an embodiment, the terminal device can use the digital product only when the eligibility verification result is that the target user successfully passes the eligibility verification.

Phase II, identification information for tracing the target user is generated.

After the target user passes the eligibility verification, the blockchain generates, based on the user identity information of the target user and/or identity information of the terminal device of the target user, the identification information for tracing the target user, and feeds the identification information for tracing the target user back to the terminal device of the target user.

In an embodiment, to simplify the solution of the embodiments of the specification, a portion of the data used by the blockchain to generate the identification information for tracing the target user may be carried in the above-described eligibility verification request message. Namely, the blockchain may generate, directly based on the eligibility information in the eligibility verification request message, the identification information for tracing the target user.

In the process of generating the identification information for tracing the target user, the blockchain first determines a data type corresponding to the digital product, and then determines to generate the identification information for tracing the target user with the same presentation manner as the data type. For example, if the digital product corresponds to a data type presented as images, the generated identification information for tracing the target user is, for example, a graphic identifier. If the digital product corresponds to a data type presented in sound, the generated identification information for tracing the target user is, for example, an audio identifier.

In an embodiment, the identification information for tracing the target user may also be obtained by compiling other information, thereby reflecting more content.

For example, the other information may include time information associated with the target user, which may include a start time and/or an end time when the terminal device of the target user presents the digital product, or an initiation time of the target user regarding the above-described eligibility verification. For another example, the other information may include location information associated with the target user, which may be a location where the terminal device of the target user presents the digital product, or may be an initiation location of the target user regarding the above-described eligibility verification.

Moreover, to ensure the uniqueness of the identification information, the identification information may also be obtained by compiling randomly defined time information. For example, after receiving the target user and performing the eligibility verification for the digital product, the blockchain generates a piece of time information based on a pre-defined random algorithm, and compiles the time information to be a part of the identification information for tracing the target user.

Phase III, the identification information for tracing the target user is embedded.

After the target user successfully passes the eligibility verification based on the blockchain, the target user may use the digital product via the terminal device. In the process of the terminal device using the digital product in this phase, the identification information needs to be embedded into content presented by the terminal device that corresponds to the digital product.

Herein, the entity to embed the identification information may be a server or may be the terminal device of the target user.

Taking the server as an example, the server can provide the presented content of the digital product to the terminal device of the target user after embedding the identification information in the presented content of the digital product.

Taking the terminal device as an example, the terminal device can use the digital product only after running an application provided by the server. During the use, the application provided by the server forces the embedding of the identification information into the content presented by the terminal device that corresponds to the digital product.

Furthermore, the identification information may include ciphertext information in the presented content or plaintext information in the presented content.

Taking the ciphertext information as an example, when the digital product comprises video data, the corresponding identification information comprises a graphic identifier. In the present phase, the graphic identifier may be split and embedded separately in the presented content of the digital product, to prevent the graphic identifier from being perceived by the target user. For example, block processing may be performed, based on play specifications (e.g., play resolution, play aspect ratio, and the like) of the terminal device for the video data, on the played content of the video data to obtain a plurality of content blocks. Then, Discrete Cosine Transform (DCT) is performed on the plurality of content blocks to obtain a frequency coefficient corresponding to each content block. The frequency coefficient may reflect the energy of a content block in the play interface. Human eyes are more sensitive to low frequency portions than to high frequency portions. If embedded in a low frequency portion, the identification information will easily be perceived, and the display quality of images is affected. Therefore, to make it difficult to perceive the identification information, the graphic identifier may be split and embedded in one or more of the obtained content blocks with a frequency coefficient greater than a preset threshold.

Taking the plaintext information as an example, when the digital product comprises video data, the corresponding identification information comprises a graphic identifier. In the present phase, layered display may be realized through the terminal device. In a display region of the terminal device, the display layer of the graphic identifier is above the display layer of the digital product to serve as an explicit warning message. Alternatively, the block processing may be similarly performed on the played content of the video data to obtain a plurality of content blocks. Then, Discrete Cosine Transform (DCT) is performed on the plurality of content blocks to obtain a frequency coefficient corresponding to each content block. As described above, human eyes are more sensitive to low frequency portions than to high frequency portions. Therefore, the graphic identifier may be embedded in content blocks with a frequency coefficient smaller than a preset threshold, so that a user can more intuitively see the graphic identifier.

When the digital product comprises audio data, the corresponding identification information comprises an audio identifier. In the present phase, the audio identifier may be played at a play progress location designated by the terminal device for the audio data. For example, a voice message representing the identity information of a target user is directly added in the preamble portion of the audio data for playing to serve as a warning.

The manner in embodiments of the specification in which the identification information is embedded may include others, the above description includes examples.

To facilitate understanding of the solutions of the embodiments of the specification, the method according to some embodiments of the specification will be described below with reference to various application scenarios.

Application Scenario I

A video website obtains the exclusive streaming right to a TV show and provides online streaming services of this TV show for subscribers to the website. To prevent subscribers from recapturing the TV show, the video website may save subscriber information to blockchain nodes and perform eligibility verification on subscribers through the blockchain technology.

When a subscriber requests the video website to stream the TV show, the subscriber needs to send personal eligibility information to a blockchain node, so that right-determination is performed on the subscriber's identity.

After authenticating the subscriber's identity, the blockchain node generates, based on the identity information of the subscriber and/or identity information of the terminal device, identification information for tracing the subscriber. When the subscriber plays the TV show, the blockchain node provides TV show images embedded with the identification information for tracing the subscriber to the subscriber for watching.

If the subscriber uses other devices to recapture the played TV show images, the identification information is also recorded in the recaptured images. If the recaptured resource is disseminated in an unauthorized manner by the subscriber, the video website may trace the subscriber who leaks the resource based on the identification information for tracing the subscriber in the recaptured images and to hold the subscriber liable for infringement actions of the subscriber.

Application Scenario II

A developer needs to perform internal testing on the developer's game by a third party. To prevent the internal testing personnel from disclosing the game content, the developer may upload information of the internal testing personnel to a blockchain node for the record, so that the eligibility verification is performed on the internal testing personnel through the blockchain technology.

The internal testing personnel can activate the application only after networking an internal testing device with a server of the developer. During the activation process, the internal testing personnel sends personal eligibility information to the blockchain node, and the blockchain node verifies the internal testing qualification of the internal testing personnel based on the eligibility information provided by the internal testing personnel. If the verification is successful, identification information for tracing the internal testing personnel is configured, and the identification information is returned to an internal testing device corresponding to the internal testing personnel.

After the internal testing personnel runs the game through the internal testing device, the game program forces embedding of the identification information into a presented content of the game.

If the internal testing personnel recaptures, without authorization, the presented content of the game in other manners (e.g., live streaming and video recording), the identification information is also recorded in the recaptured content. If the recaptured resource of this application is disseminated online, the developer may trace the internal testing personnel who leaks the resource based on the identification information in the recaptured images and hold the internal testing personnel liable for infringement actions of the internal testing personnel.

Application Scenario III

A movie is played in theatres. To restrict recapture behaviors, a movie service provider may record relevant information regarding audience watching the movie through blockchain nodes, wherein the relevant information may include, but is not limited to, identity information of the audience, seat information of the tickets purchased by the audience, information of a theatre, and showtime information of the movie. The blockchain may encode the relevant information into identification information for tracing the viewer in a reversible encoding manner.

In the process of playing the movie, a play device may obtain the identification information from the encoding from the blockchain, split the identification information, and then randomly embed the split identification information into high frequency portions of the movie images. The audience is unable to perceive the identification information in the movie images with naked eyes, thereby ensuring the movie watching experience.

In the process of playing the movie, if a viewer uses a personal device to recapture the movie, the identification information is subsequently recorded in the recaptured images. If the CAM version of the movie is disseminated online without authorization, the movie service provider may perform reversed restoration compiling on the identification information in the recaptured images to trace back the theatre, the movie showtime, all of the audience, and each viewer's seat corresponding to the recapture scenario. Then, the movie service provider further matches the viewer seats according to the recapture location shown by the recaptured images, analyzes to find the viewer who recaptured the movie, and holds the viewer liable for infringement actions of the viewer.

In summary, based on the method according to some embodiments of the specification, the eligibility verification needs to be first performed through a blockchain on a user before the user uses a digital product. After the eligibility verification is successful, the blockchain configures the user with identification information required for tracing. When the user uses the digital product through a terminal device, the identification information needs to be embedded in the content presented by the terminal device that corresponds to the digital product, so that, if the digital product is recaptured, the identification information is also recorded in the recaptured content. Then, the user who provides the recaptured resources, or even the recapture time and recapture location, can be traced according to the identification information in the recaptured content.

Therefore, the method according to some embodiments of the specification can effectively restrict unauthorized recapture behaviors of users on digital products and provide owners of the digital products with copyright protection services with higher security.

The method according to some embodiments of the specification is described above. It should be understood that appropriate variations may be made without departing from the above principles of the specification. All these variations shall fall within the scope of the embodiments of the specification.

Figure 2:
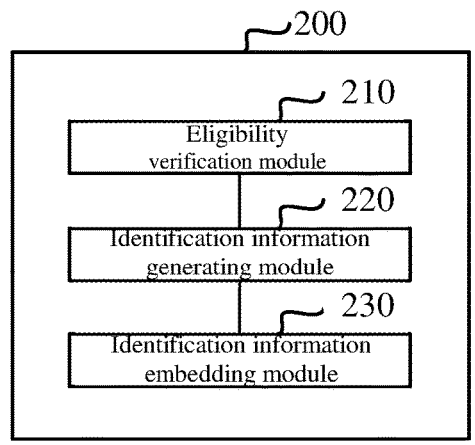
FIG. 2 is a schematic structural diagram of a blockchain-based copyright protection apparatus according to some embodiments of the specification.

Corresponding to the above-described copyright protection method, as shown in FIG. 2, the embodiments of the specification further provide a blockchain-based copyright protection apparatus 200, comprising: an eligibility verification module 210 configured to perform, based on a blockchain, the eligibility verification for a digital product on a target user; an identification information generating module 220 configured to determine, after the target user passes the eligibility verification for the digital product, identification information for tracing the target user; and an identification information embedding module 230 configured to embed, when the target user presents the digital product using a terminal device, the identification information in content presented by the terminal device that corresponds to the digital product.

Based on the copyright protection apparatus shown in FIG. 2, the eligibility verification needs to be first performed through a blockchain on a user before the user uses a digital product with a terminal device. After the user passes the eligibility verification, identification information required for tracing the user is embedded in the content presented by the terminal device that corresponds to the digital product, so that, if the digital product is recaptured, a user who provides recaptured resources can be traced according to the identification information in the recaptured content, thereby containing unauthorized recapture and dissemination behaviors to a certain degree and effectively safeguarding interests of owners of digital products.

In some embodiment of the specification, in an implementation process, the eligibility verification module 210 is configured to, for example, send an eligibility verification request message for the digital product to the blockchain, the eligibility verification request carrying eligibility information of the target user, and to receive an eligibility verification response message returned by the blockchain, the eligibility verification response message carrying an eligibility verification result of the eligibility verification performed by the blockchain based on the eligibility information for the digital product.

In some embodiments of the specification, in an implementation process, the identification information generating module 220 is configured to, for example, determine an identification information encoding manner matching the data type of the digital product, and to encode relevant information of the target user into the identification information corresponding to the digital product in the determined identification information encoding manner.

For example, if the data type of the digital product is audio, the corresponding identification information encoding manner may encode relevant information of the target user into an audio identifier. For another example, if the data type of the digital product is video, the corresponding identification information encoding manner may encode relevant information of the target user into a video identifier.

In an embodiment, the identification information of the target user is determined and obtained based on the identity information of the target user and/or identity information of the terminal device of the target user.

Herein, the user identity information may comprise an account number associated with the target user, such as an International Mobile Subscriber Identity of the target user, ID number of the target user, etc. The identity information of the terminal device may comprise an identification number associated with a terminal device, such as an International Mobile Equipment Identity, product serial number of the terminal device, etc.

In an embodiment, the identification information of the target user is determined and obtained further based on time information and/or location information related to the target user, such as the time information or location information associated with access to the digital product by the target user.

Herein, the time information may comprise a time of the right-determination by the blockchain on the target user, a time when the terminal device of the target user presents the digital product, and the like. The location information may comprise, for example, a location where the target user initiates an eligibility verification request, a location where the target user uses the terminal device to present the digital product, and the like.

In an embodiment, the identification information of the target user may be determined and obtained through the blockchain, and may be carried in the eligibility verification response message.

In an embodiment, the digital product comprises video data, and the identification information comprises a graphic identifier. In an implementation process, the identification information embedding module 230 is configured to, for example, perform, based on play specifications of the terminal device for the video data, block processing on the played content of the video data to obtain a plurality of content blocks, to perform Discrete Cosine Transform on the plurality of content blocks to obtain a frequency coefficient corresponding to each content block, and to split and embed the graphic identifier into one or more of the obtained content blocks having a frequency coefficient greater than a preset threshold.

In an embodiment, the digital product comprises video data, and the identification information comprises a graphic identifier. In an implementation process, the identification information embedding module 230 is configured to, for example, display the graphic identifier above a display layer of the terminal device for the video data.

In an embodiment, the digital product comprises audio data, and the identification information comprises an audio identifier. In an implementation process, the identification information embedding module 230 is configured to, for example, play the audio identifier at a location in the play progress designated by the terminal device for the audio data.

The blockchain-based copyright protection apparatus according to some embodiments of the specification may serve as an entity to implement the copyright protection method shown in FIG. 1. Therefore, the copyright protection apparatus can achieve the functions achieved by the copyright protection method in FIG. 1, which follows the same principle and will not be elaborated herein.

Figure 3:
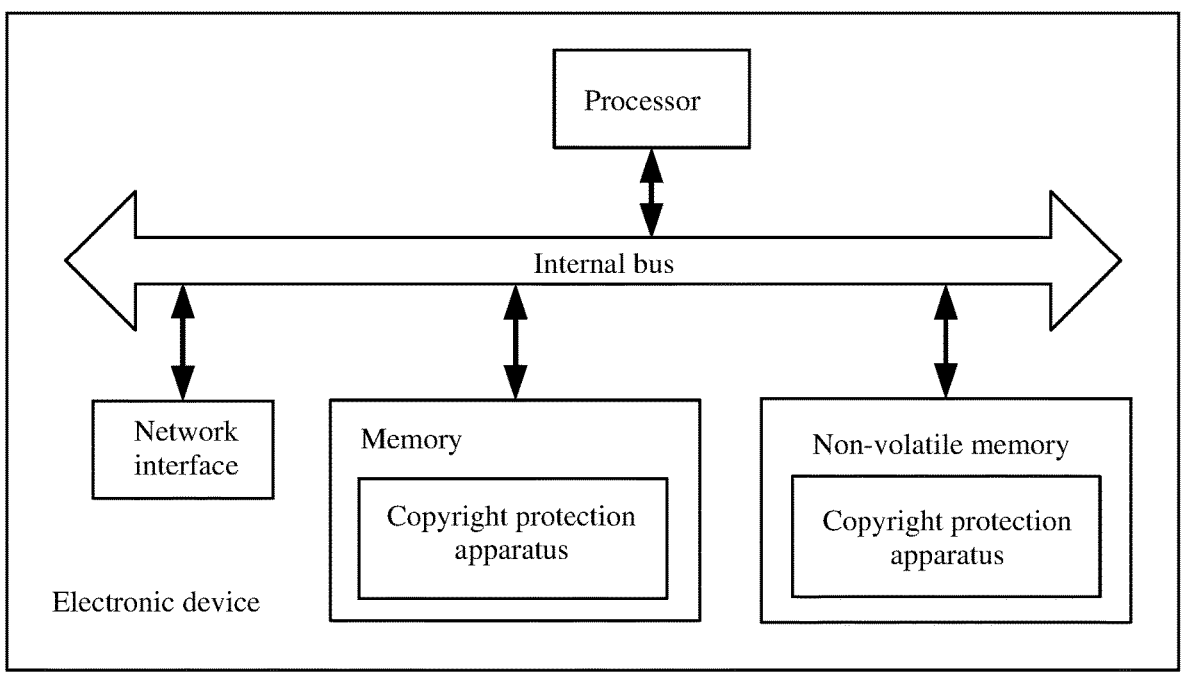
FIG. 3 is a schematic structural diagram of an electronic device according to some embodiments of the specification.

FIG. 3 is a schematic structural diagram of an electronic device for blockchain-based right protection according to some embodiments of the specification. Referring to FIG. 3, on a hardware level, the electronic device comprises a processor, and may further comprise an internal bus, a network interface, and a storage device, wherein the storage device may comprise a memory, such as a Random-Access Memory (RAM) and may further comprise a non-volatile memory, such as at least one magnetic disk. The electronic device may further comprise hardware required by other transactions.

The processor, the network interface, and the storage device may be connected to each other via the internal bus. The internal bus may be an Industry Standard Architecture (ISA) bus, a Peripheral Component Interconnect (PCI) bus, or an Extended Industry Standard Architecture (EISA) bus. The bus may comprise an address bus, a data bus, or a control bus. For ease of presentation, only one two-way arrow is used in FIG. 3, which does not indicate only one bus or one type of buses.

The storage device is configured to store a program. For example, the program may comprise program codes, and the program codes comprise computer operation instructions. The storage device may comprise a memory and a non-volatile memory, and provide instructions and data to the processor.

The processor reads a corresponding computer program into the memory from the non-volatile memory and then runs the computer program to form the copyright protection apparatus on the logic level. The processor executes the program stored in the memory and is configured, for example, to execute the following operations: sending, to a blockchain network, a request for verifying a right to access a digital product, the request comprising identity information associated with a target user; receiving, from the blockchain network, a response comprising a result of verifying the right to access the digital product based on the identity information associated with the target user; in response to the result being that the verifying the right to access the digital product is successful, determining identification information for tracing the target user; and embedding the identification information for tracing the target user in content associated with the digital product.

Based on the electronic device shown in FIG. 3, the eligibility verification needs to be first performed through a blockchain on a user before the user uses a digital product on a terminal device. After the user passes the eligibility verification, the terminal device needs to embed the identification information for tracing the user in the content presented of the digital product, so that, if the digital product is recaptured, a user who provides recaptured resources can be traced according to the identification information in the recaptured content, thereby containing unauthorized recapture behaviors to a certain degree and effectively safeguarding interests of owners of digital products.

The above-described copyright protection method as disclosed by the embodiments shown in FIG. 1 of the specification may be applied to the processor or implemented by the processor. The processor may be an integrated circuit chip with signal processing capabilities. In an implementation process, steps of the above-described method may be completed by a hardware integrated logic circuit or an instruction in the form of software in the processor. The above-described processor may be a general-purpose processor, including a Central Processing Unit (CPU), a Network Processor (NP) and the like, and may also be a Digital Signal Processor (DSP), an Application Specific Integrated Circuit (ASIC), a Field-Programmable Gate Array (FPGA) or other programmable logic devices, discrete gates, transistor logic devices, and discrete hardware components, which can implement or execute various methods, steps and logic block diagrams disclosed in the embodiments of the specification. The general-purpose processor may be a micro-processor, or the processor may be any conventional processor. Steps of the method disclosed with reference to one or more embodiments of the specification may be directly executed and completed by a hardware decoding processor or by a combination of hardware and software modules in a decoding processor. The software modules may be located in a mature storage medium in the art, such as a random-access memory, a flash memory, a read-only memory, a programmable read-only memory or an electrically erasable programmable memory, a register, and the like. The storage medium is located in the memory, and the processor reads information in the memory and completes steps of the above-described method in combination with the hardware of the processor.

It should be understood that the electronic device according to the embodiments of the specification can achieve the functions achieved by the copyright protection apparatus in the embodiments as shown in FIG. 1, which will not be elaborated herein.

In addition to the software implementation, the electronic device according to the specification does not exclude other implementations, such as logic devices or a combination of software and hardware. In other words, the execution entities of the following processing flow are not limited to various logic units, but may also be hardware or logic devices.

Furthermore, the embodiments of the specification further provide a computer readable storage medium, wherein the computer readable storage medium stores one or more programs, the one or more programs comprise instructions, and when being executed by a portable electronic device comprising a plurality of applications, the instructions cause the portable electronic device to implement the method in the embodiments as shown in FIG. 1, and for example, implement the following method: sending, to a blockchain network, a request for verifying a right to access a digital product, the request comprising identity information associated with a target user; receiving, from the blockchain network, a response comprising a result of verifying the right to access the digital product based on the identity information associated with the target user; in response to the result being that the verifying the right to access the digital product is successful, determining identification information for tracing the target user; and embedding the identification information for tracing the target user in content associated with the digital product.

When the functions disclosed herein are implemented in the form of software functional units and sold or used as independent products, they can be stored in a processor executable non-volatile computer readable storage medium. Particular technical solutions disclosed herein (in whole or in part) or aspects that contributes to current technologies may be embodied in the form of a software product. The software product may be stored in a storage medium, comprising a number of instructions to cause a computing device (which may be a personal computer, a server, a network device, and the like) to execute all or some steps of the methods of the embodiments. The storage medium may comprise a flash drive, a portable hard drive, ROM, RAM, a magnetic disk, an optical disc, another medium operable to store program code, or any combination thereof.

It should be understood that the instructions can cause, when being executed by the portable electronic device comprising a plurality of applications, the copyright protection apparatus to achieve the functions in the embodiments as shown in FIG. 1, which will not be elaborated herein.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

One of ordinary skill in the art should understand that the embodiments of the specification may be provided as a method, a system, or a computer program product. Therefore, the specification may be implemented as a complete hardware embodiment, a complete software embodiment, or an embodiment combining software and hardware. Moreover, the specification may be in the form of a computer program product implemented on one or more computer usable storage media (including, but not limited to, a magnetic disk memory, CD-ROM, an optical memory, etc.) comprising computer usable program codes.

Particular embodiments of the specification are described above, and other embodiments fall within the scope of the appended claims. In some cases, actions or steps stated in the claims may be executed in an order different from those in the embodiments and can still achieve desired results. In addition, a process depicted in the accompanying drawings does not necessarily require the illustrated particular order or continuous order to achieve desired results. In some implementations, multi-task processing and parallel processing may be feasible or may be beneficial.

The above-described is merely embodiments of the specification, which are not used to limit the specification. To one of ordinary skill in the art, the specification may have various modifications and variations. Any modification, equivalent substitution, or improvement made within the spirit and principle of the specification shall be encompassed by the claims of the specification.

The invention claimed is:

1. A method, comprising:
receiving, by a blockchain system from a terminal device, a verification request for a digital product, wherein the verification request comprises eligibility information of a user;
storing, by the blockchain system in a blockchain associated with the blockchain system, a transaction corresponding to the verification request;
performing, by the blockchain system, eligibility verification based on the eligibility information;
determining, by the blockchain system, a data type corresponding to the digital product, wherein the determining comprises determining that the digital product comprises data of an audio type or data of a video type;
generating, by the blockchain system, identification information for tracing the user based on the eligibility information in the verification request, wherein the generating comprises:
when it is determined that the digital product comprises data of the audio type, embedding information of the user into an audio identifier, and
when it is determined that the digital product comprises data of the video type, embedding information of the user into a graphic identifier for insertion in one or more portions of the digital product each having a frequency coefficient within a range; and
sending, by the blockchain system to the terminal device, a result of the eligibility verification and the generated identification information.

2. The method of claim 1, wherein the eligibility information comprises:
an ID number associated with the user;
an account number associated with the user; and
an identification number corresponding to a computing device associated with the user.

3. The method of claim 1, wherein:
the identification information for tracing the user is generated further based on time information or location information associated with the user.

4. The method of claim 3, wherein the time information comprises:
a start time of the terminal device presenting the digital product;
an end time of the terminal device presenting the digital product; or
an initiation time of the user creating the verification request.

5. The method of claim 1, wherein the generating the identification information comprises:
generating a piece of time information based on a random algorithm; and
compiling the piece of time information to be part of the identification information.

6. A system, comprising one or more processors and one or more non-transitory computer-readable storage media storing instructions executable by the one or more processors to cause the system to perform operations comprising:
receiving, from a terminal device, a verification request for a digital product, wherein the verification request comprises eligibility information of a user;
storing, in a blockchain, a transaction corresponding to the verification request;
performing eligibility verification based on the eligibility information;
determining a data type corresponding to the digital product, wherein the determining comprises determining that the digital product comprises data of an audio type or data of a video type;
generating identification information for tracing the user based on the eligibility information in the verification request, wherein the generating comprises:
when it is determined that the digital product comprises data of the audio type, embedding information of the user into an audio identifier, and
when it is determined that the digital product comprises data of the video type, embedding information of the user into a graphic identifier for insertion in one or more portions of the digital product each having a frequency coefficient within a range; and
sending, to the terminal device, a result of the eligibility verification and the generated identification information.

7. The system of claim 6, wherein the eligibility information comprises:
an ID number associated with the user;
an account number associated with the user; and
an identification number corresponding to a computing device associated with the user.

8. The system of claim 6, wherein:
the identification information for tracing the user is generated further based on time information or location information associated with the user.

9. The system of claim 8, wherein the time information comprises:
a start time of the terminal device presenting the digital product;
an end time of the terminal device presenting the digital product; or
an initiation time of the user creating the verification request.

10. The system of claim 6, wherein the generating the identification information comprises:
generating a piece of time information based on a random algorithm; and
compiling the piece of time information to be part of the identification information.

11. One or more non-transitory computer-readable storage media configured with instructions executable by one or more processors to cause the one or more processors to perform operations comprising:
receiving, from a terminal device, a verification request for a digital product, wherein the verification request comprises eligibility information of a user;
storing, in a blockchain, a transaction corresponding to the verification request;
performing eligibility verification based on the eligibility information;
determining a data type corresponding to the digital product, wherein the determining comprises determining that the digital product comprises data of an audio type or data of a video type;
generating identification information for tracing the user based on the eligibility information in the verification request, wherein the generating comprises:
when it is determined that the digital product comprises data of the audio type, embedding information of the user into an audio identifier, and
when it is determined that the digital product comprises data of the video type, embedding information of the user into a graphic identifier for insertion in one or more portions of the digital product each having a frequency coefficient within a range; and sending, to the terminal device, a result of the eligibility verification and the generated identification information.

12. The media of claim 11, wherein the eligibility information comprises:
   an ID number associated with the user;
   an account number associated with the user; and
   an identification number corresponding to a computing device associated with the user.

13. The media of claim 11, wherein:
   the identification information for tracing the user is generated further based on time information or location information associated with the user.

14. The media of claim 13, wherein the time information comprises:
   a start time of the terminal device presenting the digital product;
   an end time of the terminal device presenting the digital product; or
   an initiation time of the user creating the verification request.

15. The media of claim 11, wherein the generating the identification information comprises:
   generating a piece of time information based on a random algorithm; and
   compiling the piece of time information to be part of the identification information.

\* \* \* \* \*